United States Patent
Gaghan

[15] 3,638,292
[45] Feb. 1, 1972

[54] ROLL FOR APPLYING UNIFORM PRESSURE

[72] Inventor: Stephen B. Gaghan, Franklin Lakes, N.J.
[73] Assignee: Van Vlaanderen Machine Company, Paterson, N.J.
[22] Filed: Oct. 29, 1969
[21] Appl. No.: 872,202

[52] U.S. Cl. .................................29/113 AD, 29/116 AD
[51] Int. Cl. ........................................................B21b 31/32
[58] Field of Search .......................29/113 AD, 116 AD, 116; 100/162 B, 155

[56] References Cited

UNITED STATES PATENTS

| Re 26,219 | 6/1967 | Kusters et al. | 29/116 AD X |
| 3,043,211 | 7/1962 | Appenzeller | 29/116 UX |
| 3,119,324 | 1/1964 | Justus | 29/116 AD X |
| 3,250,211 | 5/1966 | Artama | 29/116 R X |
| 3,276,102 | 10/1966 | Justus | 29/116 AD |
| 3,430,319 | 3/1969 | Skaugen | 29/116 AD |

FOREIGN PATENTS OR APPLICATIONS

| 1,146,022 | 3/1963 | Germany | 29/116 R |
| 6,509,484 | 2/1966 | Netherlands | 29/113 AD |

Primary Examiner—Alfred R. Guest
Attorney—Brumbaugh, Graves, Donohue & Raymond

[57] ABSTRACT

A roll for applying uniform pressure has a stationary inner structure mounted between two supporting shafts. A cylindrical outer structure surrounds the stationary inner structure and is rotatably mounted on the shafts. A plurality of inner rollers is disposed in a slot formed in the inner structure and contacts a colinear series of locations along the inside of the outer structure. An inflatable bag is disposed within the slot and, when inflated with a fluid, applies a uniform pressure to the inner rollers. These rollers prevent the outer structure from deflecting and cause it to apply a uniform pressure to an opposing surface.

4 Claims, 3 Drawing Figures

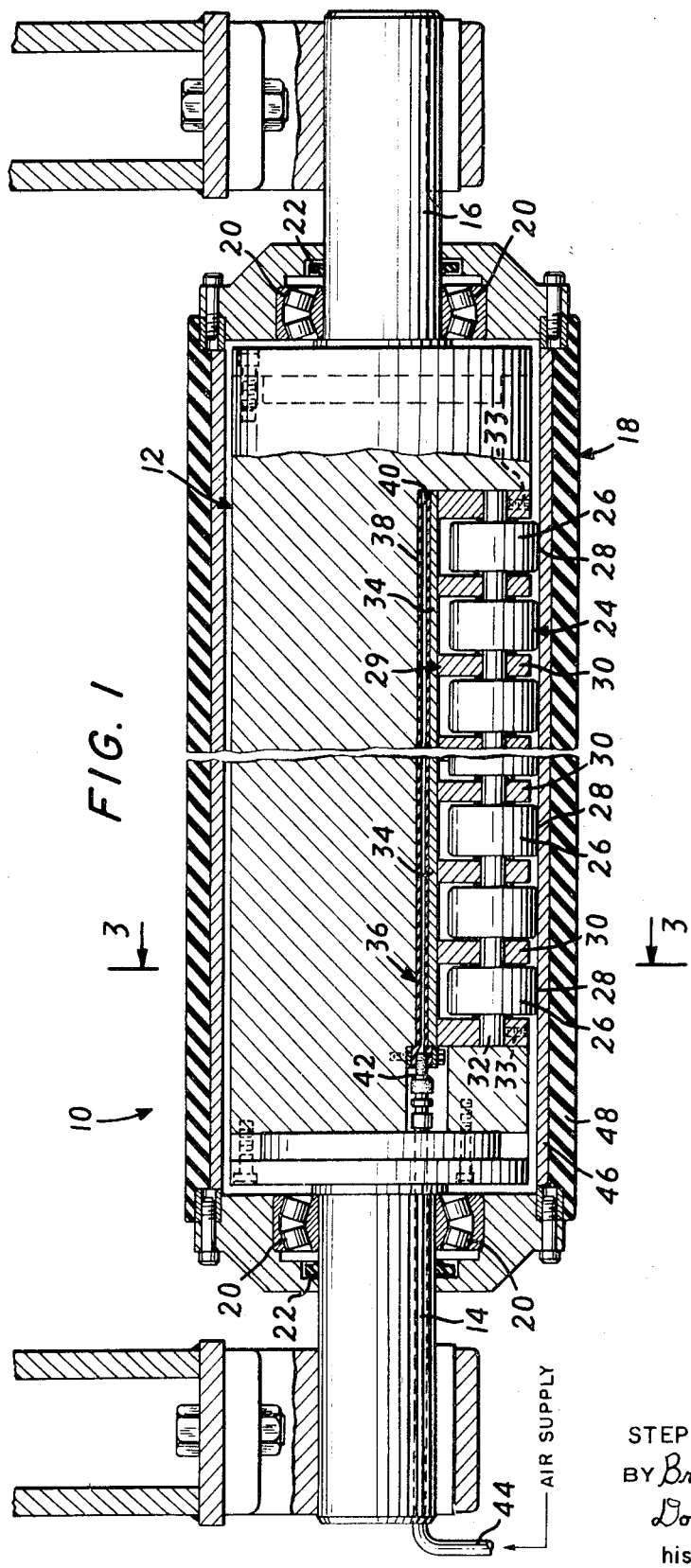

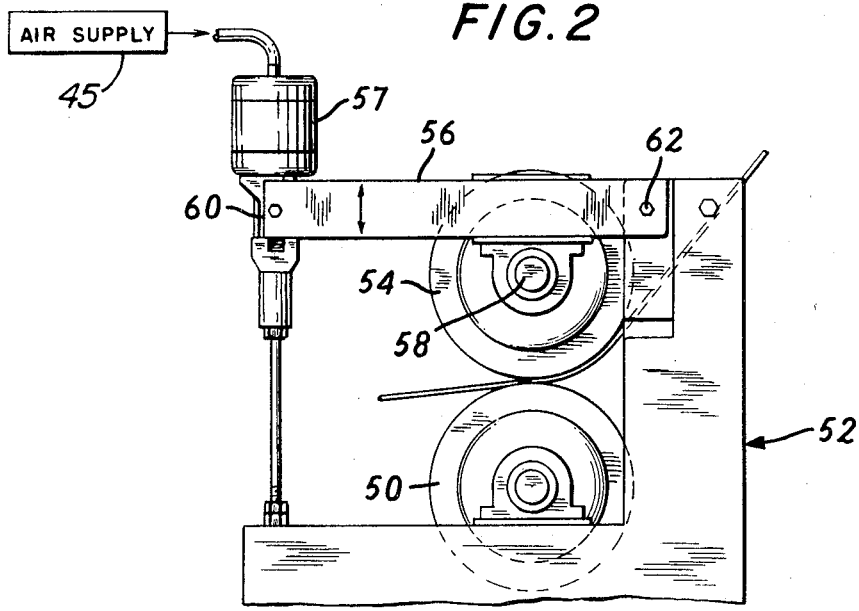
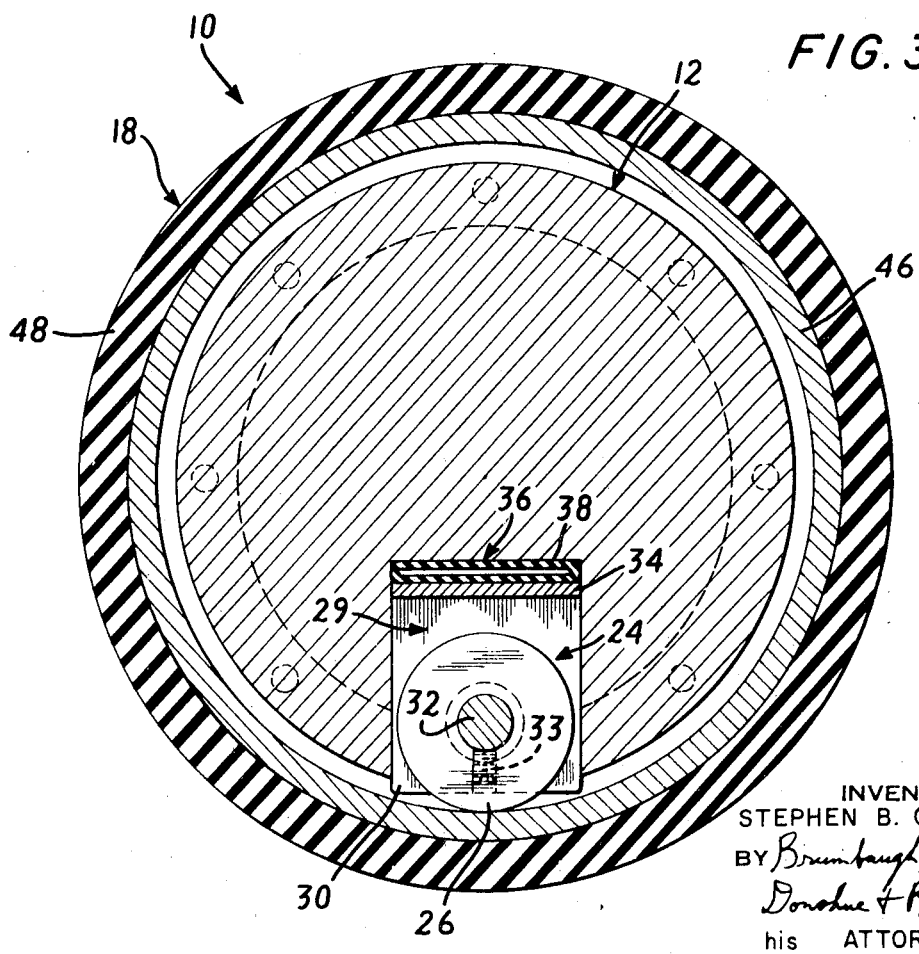

ROLL FOR APPLYING UNIFORM PRESSURE

BACKGROUND OF THE INVENTION

The present invention relates to a roll for applying uniform pressure to a web of material, and more particularly to a novel and highly effective nondeflecting roll having a stationary inner structure and a rotatable outer structure.

A persistent problem associated with the use of rolls to apply pressure to a web of material is that the roll tends to deflect at the center thereby causing the pressure applied to the web to be nonuniform. This problem arises, for example, in the textile industry in which dye is removed from material by passing it between two rolls. Even relatively large and heavy rolls have been found to deflect sufficiently at the center to reduce the pressure applied there as compared to the pressure applied at the ends of the roll. The result of this nonuniform pressure is that more dye is removed from the edges of the material than is removed from the center and the color of the material produced is therefore not uniform.

It is known to use backup rolls to reduce the deflection of the pressure-applying rolls. In addition, a variety of rolls is known in which stationary inner structure is used to apply pressure to the inner surface of a rotatable outer structure. In some arrangements a sliding shoe presses against the inner surface of the outer structure. In other arrangements a series of inner rollers is disposed along the inner surface of the outer structure. In these arrangements each of the individual inner rollers is forced against the rotatable outer structure by a separate hydraulic cylinder, bellows, or other fluid pressure applying means.

Known devices of the above type possess various drawbacks such as high cost of manufacture and the creation of undesirable frictional forces with accompanying lubrication problems. Maintenance problems are associated with undesirably complex hydraulic systems. Maintenance problems are of particular importance because the internal mechanism of such a roll is often not easily accessible. Large production lines can be subject to lengthy interruptions because of the need to repair a roll.

The use of a multiplicity of small cylinders to apply pressure to individual inner rollers often allows undesirably large amounts of the fluid which operates the system to escape. This is particularly true when the fluid is air which is otherwise desirable because it is readily available for replacement.

SUMMARY OF THE INVENTION

The present invention provides a relatively simple and easily manufacturable solution to the problems indicated above. A roll for applying uniform pressure to a web of material comprises two supporting shafts, a stationary inner structure mounted between the two shafts, and a cylindrical outer structure surrounding the stationary inner structure and rotatably mounted on the shafts. A plurality of inner rollers which are at least partially disposed in a slot defined by the inner structure is arranged to contact a colinear series of locations along the inside of the outer structure. A roller support means is disposed within a slot provided in the inner structure and rotatably supports the inner rollers. An elongated inflatable bag is disposed within the slot between the inner structure and the roller support means. An pressure supply means is provided for inflating the bag and causing it to press against the roller support means thereby urging the rollers against the inside of the outer structure and causing the outer structure to apply a uniform pressure to an opposing surface.

The pressure supply means, which may be an air pump, is connected to and operates a means for supplying a force to the supporting shafts.

BRIEF DESCRIPTION OF THE DRAWINGS

An understanding of additional aspects of the invention can be gained from a consideration of the following detailed description of a representative embodiment of the invention in conjunction with the appended drawings wherein:

FIG. 1 is a fragmented sectional front elevation of a roll;

FIG. 2 is a side elevation of an apparatus employing two cooperating rolls of the type shown in FIG. 1; and FIG. 3 is a sectional side elevation of the roll shown in FIG. 1 taken along the line 3—3.

DESCRIPTION OF THE PREFERRED EMBODIMENT

FIG. 1 shows a roll 10 for applying uniform pressure to a web of material comprising a stationary inner structure 12 mounted between two supporting shafts 14 and 16. A cylindrical outer structure 18 is rotatably mounted on the shafts 14 and 16. A plurality of bearings 20, with associated lubricant seals 22, provides a means for rotatably mounting the outer structure 18. FIG. 1 is a fragmented view of the roll 10 which may be of any suitable length.

A slot 24 is defined by the stationary inner structure 12 and preferably extends substantially throughout its length. The slot 24 extends longitudinally along the inner structure 12 parallel to the axis of rotation of the outer structure 18. A plurality of inner rollers 26 is disposed within the slot 24. The rollers 26 are arranged to contact a colinear series of locations 28 along the inside of the outer structure 18. The cooperation between the inner rollers 26 and the outer structure 18 can be seen most clearly in the cross-sectional view of FIG. 3.

A roller support means 29 is disposed within the slot 24 for rotatably supporting the inner rollers 26. The roller support means 29 comprises a series of support members 30, each of which is positioned between two of the inner rollers 26, and a rod 32, engaged by the support members 30, on which the inner rollers 26 are freely rotatable. The rod 32 is secured to the support members 30 by setscrews 33. The roller support means 29 further comprises a platelike flexible member 34 which is disposed between the support members 30 and an elongated inflatable bag 36.

The bag 36, which may be made of rubber or other such flexible material, extends substantially throughout the length of the slot 24. The bag 36 preferably comprises a long neoprene tube 38 which is closed at the ends by rubber plugs 40 and 42 to which the neoprene tube 38 is vulcanized. The bag 36 is suitable for an inflation pressure of the order of, for example, 100 pounds per square inch.

A conduit in the form of a hose 44 passes through the shaft 14 and is inserted in a hole in the plug 42. The hose 44 is connected to a pressure supply means for inflating the bag 36 thereby causing the bag 36 with a pressure medium to press against the roller support means 29, urging the rollers 26 against the inside of the outer structure 18. The means for inflating the bag 36 may comprise an air pump, although suitable fluids other than air may also be employed. The use of air is preferred because it makes the system less expensive to build and operate. The tendency of the air to escape is minimized because of the simplicity of the pressure system.

The inner structure 14, which is made of steel, is substantially cylindrical in shape except for the inclusion of the slot 24. This construction is preferred because it most effectively utilizes the space available within the outer structure 12.

The outer structure 12 comprises a steel drum 46 which has a rubber covering 48. If the roll 10 is used, for example, to remove dyes from textiles, the rubber covering 48 protects the textiles from damage when high pressure is applied.

It is important that the structure of the roll 10 causes uniform pressure to be applied to another roll or other opposing surface contacted by the roll at all points throughout the length of the roll 10. This pressure is uniform despite any tendency of the inner or outer structure to bend or deflect because the pressure throughout the inflatable bag 36 is equal at all points along its surface. Accordingly, each of the rollers 26 is urged away from the inner structure 12 with an equal force regardless of any deflection of the inner structure 12 or the roller support means 29. The equal force applied to each roller 26 is transmitted through the outer structure 18 of the roll 10 and a uniform pressure is applied to an opposing surface. Nonuniformity of pressure attributable to deflection of the roll is thus eliminated.

An apparatus for applying uniform pressure to a web material comprising two cooperating rolls, one or both of which may be of the type described above, is shown in FIG. 2. A first roll 50 is supported in a fixed position and rotatably mounted on a supporting structure 52. A second roll 54 is mounted on a beam 56 which is pivotably attached to the supporting structure 52.

A means 57 is provided for applying forces to the two supporting shafts 58 of the roll 54 thus forcing the two rolls 50 and 54 together. The force-applying means 57 causes the beam 56 to pivot about a point 62 on the supporting structure 52. As the force applied is increased the spacing between the rolls 50 and 54 is reduced and the pressure is thus increased. This causes the roll 54 to apply pressure to the opposing surface of the roll 50 as determined by the forces applied to the supporting shafts 58 which are mounted on the beam 56. The fluid pressure which operates the force-applying means 57 is supplied by an inflating means while also causes a bag within the roll 54 to be inflated as explained above.

The connecting means between the inflating means, the force-applying means, and the inflatable bag is arranged and the structure is dimensioned so that pressure within the inflatable bag is, at all times, of the proper value in relation to the pressure applied by the roll 54 due to the forces acting on the supporting shafts 58. This insures that there will be no deflection and that the pressure applied by the roll 54 will be uniform. Thus, the user of the apparatus need make only one adjustment to change the pressure applied to the material worked upon. The adjustment of the corresponding pressure applied by the bag to the inner rollers is automatically brought about by the relationships inherent in the pressure system.

If desired, means may be provided for independently adjusting the pressure within the inflatable bag. It is also possible to provide means for independent adjustment of the pressure applied to each of the two shafts 58. This additional adjusting means can be used when special operating conditions are present.

It will be obvious to those skilled in the art that the above-described embodiment is meant to be merely exemplary and that it is susceptible of modification and variation without departing from the spirit and scope of the invention. For example, the rod 32 connecting the inner rollers 26 of the roll could be replaced by a plurality of shorter rods each of which carries only one inner roller. Therefore, the invention is not deemed to be limited except as defined by the appended claims.

I claim:

1. In a textile processing apparatus, a roll for applying uniform pressure to an opposing surface comprising two shafts, a stationary inner structure mounted between the shafts, a slot extending substantially throughout the length of said inner structure, a rotatable steel cylinder having an outer rubber coating surrounding the inner structure, a bearing mounted on each of the shafts to rotatably support the cylinder, a plurality of support members disposed within the slot defined by the inner structure, a rod extending substantially throughout the length of the slot, the rod being supported by and extending through each of the support members, a plurality of evenly spaced inner rollers disposed within the slot, journaled on the rod, and arranged to contact a colinear series of locations along the inside of the steel cylinder, one roller being positioned between each two successive support members, an elongated inflatable bag disposed within the slot, against the inner structure, and behind the inner rollers, a flexible plate disposed between the bag and the support members which extends substantially throughout the length of the slot, a pressure supply means for inflating the bag causing it to urge each of the inner rollers against the inside of the steel cylinder, a conduit extending through one of the shafts for supplying a pressure medium to the bag, and a mass for applying a force to the shafts whereby the steel cylinder is urged toward the opposing surface, the means for applying a force being connected to and operated by the pressure supply means.

2. The apparatus of claim 1 wherein the pressure supply means is an air pump.

3. The apparatus of claim 1 wherein the inflatable bag is formed by a rubber tube closed at each end by a rubber plug.

4. The apparatus of claim 1 wherein the inner structure is cylindrical in shape except for the inclusion of the slot.

* * * * *